United States Patent
Stanhope et al.

(10) Patent No.: US 11,665,991 B2
(45) Date of Patent: Jun. 6, 2023

(54) SYSTEM AND METHOD FOR MONITORING THE LEVELNESS OF A MULTI-WING AGRICULTURAL IMPLEMENT

(71) Applicant: CNH Industrial America LLC, New Holland, PA (US)

(72) Inventors: Trevor Stanhope, Palos Hills, IL (US); Joshua David Harmon, Leola, PA (US)

(73) Assignee: CNH Industrial America LLC, New Holland, PA (US)

( * ) Notice: Subject to any disclaimer, the term of this patent is extended or adjusted under 35 U.S.C. 154(b) by 546 days.

(21) Appl. No.: 16/580,252

(22) Filed: Sep. 24, 2019

(65) Prior Publication Data
US 2021/0084804 A1   Mar. 25, 2021

(51) Int. Cl.
*A01B 79/00* (2006.01)
*A01B 63/16* (2006.01)
*A01B 63/24* (2006.01)
*A01B 76/00* (2006.01)
*G01B 11/24* (2006.01)
(Continued)

(52) U.S. Cl.
CPC .......... *A01B 79/005* (2013.01); *A01B 63/16* (2013.01); *A01B 63/24* (2013.01); *A01B 76/00* (2013.01); *A01B 21/08* (2013.01); *G01B 11/24* (2013.01); *G01B 15/04* (2013.01)

(58) Field of Classification Search
CPC .......... A01B 79/005; A01B 3/16; A01B 3/24; A01B 76/00; A01B 21/08; G01B 11/24; G01B 15/04
See application file for complete search history.

(56) References Cited

U.S. PATENT DOCUMENTS

| | | |
|---|---|---|
| 8,738,244 B2 | 5/2014 | Lenz et al. |
| 8,843,269 B2 | 9/2014 | Anderson et al. |
| 8,857,530 B2 | 10/2014 | Henry |

(Continued)

FOREIGN PATENT DOCUMENTS

| | | |
|---|---|---|
| DE | 10349321 | 5/2005 |
| EP | 2668469 B1 | 12/2013 |

(Continued)

OTHER PUBLICATIONS

International Search Report and Written Opinion Corresponding to Application No. PCT/US2020/052122 dated Jan. 13, 2021 (12 pages).

(Continued)

*Primary Examiner* — Tara Mayo
(74) *Attorney, Agent, or Firm* — Rebecca Henkel; Rickard DeMille (57) ABSTRACT

A system for monitoring the levelness of a multi-wing agricultural implement may include a central frame section, a wing section pivotably coupled to the central frame section and a field contour sensor configured to generate data indicative of a contour of an aft portion of the field located rearward of the implement relative to a direction of travel of the implement. The system may further include a controller communicatively coupled to the field contour sensor. The controller may be configured to monitor the data received from the field contour sensor and assess a levelness of the implement based at least in part on the contour of the aft portion of the field.

20 Claims, 5 Drawing Sheets

(51) Int. Cl.
    *G01B 15/04*     (2006.01)
    *A01B 21/08*     (2006.01)

(56) References Cited

U.S. PATENT DOCUMENTS

| | | |
|---|---|---|
| 9,026,321 B2 | 5/2015 | Henry et al. |
| 9,144,188 B2 | 9/2015 | Bover Trobat |
| 9,282,688 B2 | 3/2016 | Casper et al. |
| 9,516,802 B2 | 12/2016 | Zemenchik |
| 10,123,475 B2 | 11/2018 | Posselius et al. |
| 10,255,670 B1* | 4/2019 | Wu et al. ............... A01B 63/24 172/4 |
| 10,262,206 B2 | 4/2019 | Posselius |
| 2014/0000919 A1* | 1/2014 | Bachman et al. ..... A01B 63/24 172/4 |
| 2015/0012189 A1* | 1/2015 | Henry et al. ........... A01B 63/28 701/50 |
| 2017/0112043 A1 | 4/2017 | Nair et al. |
| 2017/0251587 A1* | 9/2017 | Sporrer et al. ...... A01B 63/1112 |
| 2018/0114305 A1* | 4/2018 | Strnad et al. ........... G06T 7/001 |
| 2018/0206393 A1 | 7/2018 | Stoller et al. |
| 2018/0310474 A1 | 11/2018 | Posselius et al. |
| 2019/0008088 A1 | 1/2019 | Posselius et al. |
| 2019/0244339 A1 | 8/2019 | Strnad et al. |
| 2020/0060062 A1 | 2/2020 | Sporrer et al. |
| 2020/0329626 A1 | 10/2020 | Ferrari |

FOREIGN PATENT DOCUMENTS

| | | |
|---|---|---|
| EP | 3189719 A1 | 7/2017 |
| WO | WO2016182906 | 11/2016 |

OTHER PUBLICATIONS

Lin Chen, "Design and Evaluation of a Levelling System for Weeding Robot," IFAC-Papers OnLine, vol. 49, Isssue 16, 2016, pp. 299-304, https://wwww/sciencedirect.com/science/article/pii/S2405896316316184.

Manuel Vázquez-Arellano, "3-D Imaging Systems for Agricultural Applications," Sensors 16(5):618, Apr. 2016 (36 pages) https://www.researchgate.net/publication/301790612_3-D_Imaging_Systems_for_Agricultural_Applications-A_Review.

Zhiang Zheng, "Design of Measuring Method and Instrument for Agricultural Soil Surface Roughness," American Society of Agricultural and Biological Engineers, Dated Apr. 17, 2019 (1 page) https://elibrary.asabe.org/abstract.asp?aid=48363&t=3&redir=&redirType=.

Operator's Manual, True-Tandem™ 335 VT, (42-47 Foot) Vertical Tillage, Part No. 47934942, $2^{nd}$ Edition English Aug. 2016, Replaces Part No. 47789750, Case IH Agriculture (144 pages).

Screen captures from YouTube video clip entitled "True-Tandem 335VT: Troubleshooting Tips," 5 pages, uploaded on Jan. 22, 2016 by user "Case IH North America." Retrieved from Internet: https://www.youtube.com/watch?v=_vLQu_RZVgg.

\* cited by examiner

SYSTEM AND METHOD FOR MONITORING THE LEVELNESS OF A MULTI-WING AGRICULTURAL IMPLEMENT

FIELD OF THE INVENTION

The present subject matter relates generally to agricultural implements, and, more particularly, to systems and methods for monitoring the levelness of a multi-wing agricultural implement.

BACKGROUND OF THE INVENTION

A wide range of farm implements have been developed and are presently in use for tilling, planting, harvesting, and so forth. Tillers, for example, are commonly towed behind tractors and may cover wide swaths of ground to be prepared for planting. To make the tilling operation as efficient as possible, very wide swaths may be covered by extending wing assemblies on either side of a central frame section of the implement being pulled by the tractor. Typically, the central frame section and the wing assemblies include one or more toolbars, various ground-engaging tools mounted on the toolbar(s), and one or more associated support wheels. The wing assemblies are commonly disposed in a "floating" arrangement during the tilling operation, wherein the tools contact the soil with sufficient force to open the soil.

In certain instances, the wing assemblies become out-of-level during the performance of the tilling operation, which results in uneven penetration depths across the width of the implement. For example, the central frame section, the inner-wing sections, and/or the outer-wing sections of the wing assemblies may extend at different angles relative to a horizontal reference plane and/or each other. This can result in the field having an uneven contour following the tillage operation. However, it is often difficult for an operator to see the performance at the rear of the implement, which means that the quality of the agricultural operation may be affected for long periods of operation. Further, manually leveling the implement is time consuming and, in some cases, needs to be repeated multiple times throughout a working operation of the implement.

Accordingly, an improved system and related method for monitoring the levelness of a multi-wing agricultural implement would be welcomed in the technology.

BRIEF DESCRIPTION OF THE INVENTION

Aspects and advantages of the invention will be set forth in part in the following description, or may be obvious from the description, or may be learned through practice of the invention.

In one embodiment, the present subject matter is directed to a system for monitoring the levelness of a multi-wing agricultural implement. The system includes a central frame section and a wing section pivotably coupled to the central frame section. The system further includes a field contour sensor configured to generate data indicative of a contour of an aft portion of the field located rearward of the implement relative to a direction of travel of the implement. Additionally, the system includes a controller communicatively coupled to the field contour sensor, with the controller being configured to monitor the data received from the field contour sensor and assess a levelness of the implement based at least in part on the contour of the aft portion of the field.

In another embodiment, the present subject matter is directed to a method for monitoring the levelness of a multi-wing agricultural implement. The multi-wing agricultural implement has a central frame section and a wing section pivotably coupled to the central frame section. The method includes receiving, with a computing device, data indicative of a contour of an aft portion of a field located rearward of the implement relative to a direction of travel of the implement. The method further includes analyzing, with the computing device, the data to assess the levelness of the implement. Additionally, the method includes, initiating, with the computing device, a control action associated with leveling the implement when it is determined that at least one of the central frame section or the wing section is out-of-level.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a system and method for monitoring the levelness of a multi-wing agricultural implement having two or more wing sections. Specifically, in several embodiments, the disclosed system may monitor a contour of the field behind the multi-wing implement as the implement performs an operation within the field to estimate the levelness of the multi-wing implement. For instance, in accordance with aspects of the present subject matter, a field contour sensor may be provided in association with the implement, with the field contour sensor being configured to capture data indicative of the contour of a portion of a field located aft or rearward of the tillage implement. The contour of such aft portion of the field may generally be indicative of the levelness of the various frame sections of the implement relative to a level reference plane and/or the levelness of the different frame sections of the implement relative to each other. Accordingly, a controller of the disclosed system may be configured to determine the levelness of the implement based on the detected contour of the field. In some embodiments, the controller may further be configured to automatically initiate a control action to adjust the levelness of the implement based on the determined levelness of the implement. In one embodiment, the control action may include adjusting the operation of one or more actuators of the implement to adjust the relative positioning of the frame sections, such as by actuating one or more of the wing sections relative to the central frame section. In some embodiments, the control action may include adjusting the speed of the implement to adjust the relative positioning of the frame sections.

Figure 1:
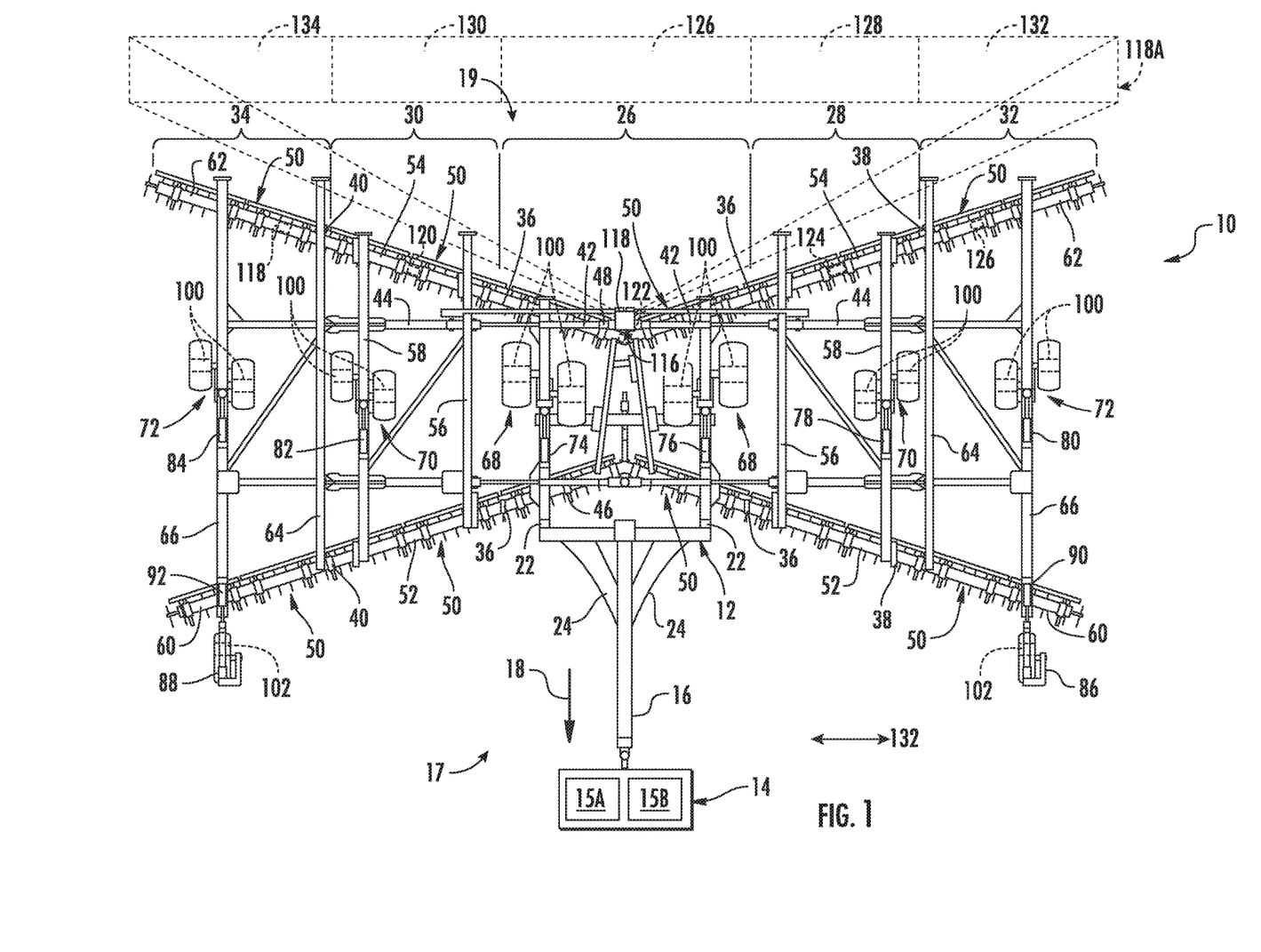
FIG. 1 illustrates a top view of one embodiment of a multi-wing agricultural implement in accordance with aspects of the present subject matter.

Referring now to FIG. 1, a top view of one embodiment of a multi-wing agricultural implement 10 is illustrated in accordance with aspects of the present subject matter. As shown, the implement 10 is configured as a multi-wing disk ripper. However, in other embodiments, the implement 10 may have any other suitable implement configuration, such as by being configured as any other suitable multi-wing implement, including any other suitable tillage implement (e.g., a cultivator) or other implement (e.g., a planter, seeder, sprayer, fertilizer, and/or the like).

As shown, the implement 10 includes a carriage frame assembly 12 configured to be towed by a work vehicle 14 (shown schematically in FIG. 1), such as a tractor. The carriage frame assembly 12 may generally extend between a forward end 17 and an aft end 19 along a forward direction of travel 18 of the implement and may include a pull hitch 16 extending in the direction of travel 18 of the implement 10 at the forward end 17 of the implement 10 and carrier frame members 22 which are coupled with and extend from the pull hitch 18. Reinforcing gusset plates 24 may be used to strengthen the connection between the pull hitch 18 and the carrier frame members 22. As shown schematically in FIG. 1, the work vehicle 14 may include an engine 15A and a transmission 15B. The transmission 15B may be operably coupled to the engine 15A and may provide variably adjusted gear ratios for transferring engine power to wheels or track assemblies (not shown) of the work vehicle 14 via a drive axle assembly (not shown) (or via axles if multiple drive axles are employed) for driving the work vehicle 14.

As shown in FIG. 1, the tillage implement 10 is configured as a multi-section implement including a plurality of frame sections. Specifically, in the illustrated embodiment, the tillage implement 10 includes a central frame section 26, inner right and left wing frame sections 28, 30 pivotally coupled to the central frame section 26, and right and left outer-wing sections 32, 34 pivotally coupled to the respective right and left inner-wing sections 28, 30. For example, each of the inner-wing sections 28, 30 is pivotally coupled to the central frame section 26 at pivot joints 36. Similarly, the right outer-wing section 32 is pivotally coupled to the right inner-wing section 28 at pivot joints 38 while the left outer-wing section 34 is pivotally coupled to the left inner-wing section 30 at pivot joints 40. As is generally understood, the pivot joints 36, 38, 40 may be configured to allow relative pivotal motion between adjacent frame sections of the implement 10. For example, the pivot joints 36, 38, 40 may allow for articulation of the various frame sections between a fully-extended position, in which the frame sections are all intended to be disposed substantially in a common plane, and a transport position, in which the wing sections 28, 30, 32, 34 are folded upwardly to reduce the overall width of the implement 10.

Additionally, as shown in FIG. 1, the implement 10 may include inner-wing actuators 42 coupled between the central frame section 26 and the inner-wing sections 28, 30 to enable pivoting or folding between the fully-extended and transport positions. For example, by retracting/extending the inner-wing actuators 42, the inner-wing sections 28, 30 may be pivoted or folded relative to the central frame section 26 about the pivot joints 36. Moreover, the implement 10 may also include outer-wing actuators 44 coupled between each inner-wing section 28, 30 and its adjacent outer-wing section 32, 34. As such, by retracting/extending the outer-wing actuators 44, each outer-wing section 32, 34 may be pivoted or folded relative to its respective inner-wing section 28, 30. As will be discussed in greater detail below, the outer-wing actuators 44 may further be configured to adjust the relative orientation of each outer-wing section 32, 34 to its respective inner-wing section 28, 30 during operation of the implement 10.

Moreover, each of the frame sections may be configured to support a plurality of ground-engaging tools, such as one or more gangs of disk blades 50. In such an embodiment, the gangs of disk blades 50 may be supported relative to frame members 46, 48, 52, 54, 60, 62 of the frame sections in any suitable manner so as to provide smooth working of the soil. However, it should be appreciated that, in other embodiments, any other suitable ground-engaging tools, such as shanks, tines, rolling baskets, and/or the like, may be supported by the various frame members.

In several embodiments, the various frame sections 26, 28, 30, 32, 34 of the tillage implement 10 may be configured to be positioned at variable positions relative to the soil in order to set the position of the gangs of disk blades 50 above the soil as well as the penetration depth of the disk blades 50. For example, in the illustrated embodiment, the tillage implement 10 includes center transport wheels 68 pivotally interconnected with the carrier frames 22 so that they provide support to the forward and aft frame members 46 and 48 relative to the soil. Similarly, inner-wing transport wheels 70 may be interconnected with the frame elements 58 to support and variably position the inner-wing sections 28, 30 relative to the soil. In addition, outer-wing transport wheels 72 may be pivotally mounted on the frame members 66 to support and variably position the outer-wing sections 32, 34 relative to the soil.

In such an embodiment, wheel actuators may also be provided in operative association with the various wheels to adjust the relative positioning between the frame sections and the soil. For instance, center wheel actuators 74, 76 may be utilized to manipulate the center transport wheels 68 to establish the distance of the central frame section 26 relative to the soil while inner-wing wheel actuators 78, 82 may be used to variably position the inner-wing sections 28, 30 relative to the soil. Similarly, outer-wing wheel actuators 80, 84 may be used to variably position the outer-wing sections 32, 34 relative to the soil.

It should be appreciated that the implement 10 may also include gauge wheels 86, 88 on the outer-wing sections 32, 34 to orient the fore-to-aft angle of the tillage implement 10 relative to the soil. In such an embodiment, gauge wheel actuators 90, 92 may be provided in operative association with the gauge wheels 86, 88 to allow the fore-to-aft angle of the implement 10 to be adjusted. As shown in FIG. 1, in one embodiment, the gauge wheels 86, 88 may correspond to the forward-most ground-engaging components of the implement 10.

Figure 2:
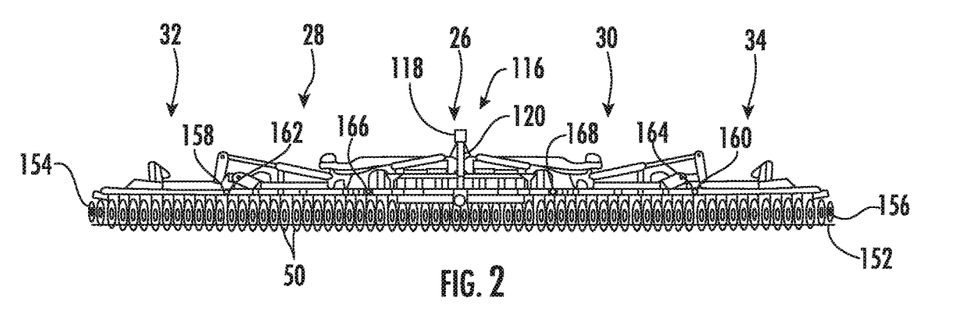
FIG. 2 illustrates a rear view of the implement shown in FIG. 1 when in a level orientation, particularly illustrating a level field contour created by the implement in such level orientation accordance with aspects of the present subject matter.

In accordance with aspects of the present subject matter, the implement 10 may be configured to support a sensing assembly 116 that generates or provides data indicative of the relative orientation, levelness and/or inclination of the frame sections. For instance, the sensing assembly 116 may include one or more sensors mounted to or supported on the various frame sections 26, 28, 30, 32, 34 for monitoring the orientation, levelness and/or inclination of the frame sections. For example, as shown in FIG. 1, a field contour sensor 118 may be supported on the implement 10, with the field contour sensor 118 having a field of view 118A directed towards the field. In some embodiments, the field contour sensor 118 may be supported on one of the frame members 46, 48 of the central frame section 26, for instance, by a support arm 120 (FIGS. 2 and 3).

More particularly, the field contour sensor 118 may be supported relative to the implement 10 such that the field of view 118A of the field contour sensor 118 is directed towards an aft portion of the field disposed rearward of the implement 10 relative to the direction of travel 18 of the implement 10. For example, in the embodiment shown, the support arm 120 is positioned at or adjacent to the aft end 19 of the implement 10. As such, the field contour sensor 118 may be configured to generate data indicative of one or more field conditions associated with the aft portion of the field located behind or aft of the implement 10. For instance, the field contour sensor 118 may be configured to generate data indicative of at least a contour or profile of the aft portion of the field. In this regard, the field contour sensor 118 may be configured as any suitable device, such as camera(s) (including stereo camera(s), and/or the like), LIDAR device(s), radar sensor(s), ultrasonic sensor(s), and/or the like such that the field contour sensor 118 generates image data, point-cloud data, radar data, ultrasound data, and/or the like to generate data indicative of the levelness or surface contour of the aft portion of the field. Alternatively or additionally, in some embodiments, the field contour sensor 118 may be configured as a mechanical sensor mounted to the implement 10 and having at least one component configured to be in contact with the field such that the mechanical field contour sensor 118 may detect a height of the implement 10, or section of the implement 10, above the field surface. For instance, the field contour sensor 118 may be configured as a rotary sensor with a feeler arm configured to contact the field surface and rotate with changes in such contact, thereby allowing such sensor to provide an indication of the levelness or surface contour of the field.

As will be described below, the contour of the aft portion of the field may be determined based on the data from the field contour sensor 118 and subsequently used as an indicator of the levelness of the implement 10. More particularly, the data from the field contour sensor 118 may be used as in indicator of the contours of different lateral sections of the aft portion of the field positioned behind the implement 10, with the contours of the different lateral sections of the aft portion of the field generally corresponding to the levelness of the various, respective frame sections 26, 28, 30, 32, 34 of the implement 10 relative to the ground, and/or each other.

For example, as shown in FIG. 1, a central section 126 of the swath of the field located behind the implement 10 and within the field of view 118A of the field contour sensor 118 is generally aligned with the central frame section 26 of the implement, with a contour of such central section 126 of the swath being affected by the levelness of the central frame section 26. Similarly, inner sections 128, 130 of the swath located behind the implement 10 are generally aligned with respective ones of the inner-wing sections 28, 30, with the contours of the inner sections 128, 130 of the swath being affected by the levelness of the inner-wing sections 28, 30. Additionally, outer sections 132, 134 of the swath located behind the implement 10 are generally aligned with respective ones of the outer-wing sections 32, 34, with the contours of the outer sections 132, 134 of the swath being affected by the levelness of the outer-wing sections 32, 34. Thus, based on the relative surface contours of the different lateral sections 126, 128, 130, 132, 134 of the field located immediately aft of the implement 10, the implement 10 may be adjusted or leveled to provide a more level surface contour.

It should be appreciated that, while the sensing assembly 116 is shown as having only one field contour sensor 118, the sensing assembly 116 may have any other suitable number of field contour sensors 118, such as two or more field contour sensors 118. Further, while only one sensing assembly 116 is shown, implement 10 may support any other suitable number of sensing assemblies 116. Furthermore, in alternative embodiments, the sensing assembly 116 may be supported at any other suitable location on the implement 10 and/or the towing vehicle 14 such that the field of view 118A of the field contour sensor 118 is directed towards the aft portion of the field and/or any other suitable portion of the field.

It should also be appreciated that the configuration of the implement 10 described above and shown in FIG. 1 is provided only to place the present subject matter in an exemplary field of use. Thus, it should be appreciated that the present subject matter may be readily adaptable to any manner of implement configuration. For example, in an alternative embodiment, the implement 10 may include a single wing section disposed along each side of the central frame section 26 or three or more wing sections disposed along each side of the central frame section 26. Similarly, in another embodiment, any other suitable type of ground-engaging tool (or any combination of ground-engaging tools), including disks, shanks, tines, baskets, and/or the like, may be coupled to or otherwise supported by the various frame sections 26, 28, 30, 32, 34 of the implement 10.

Figure 3A:
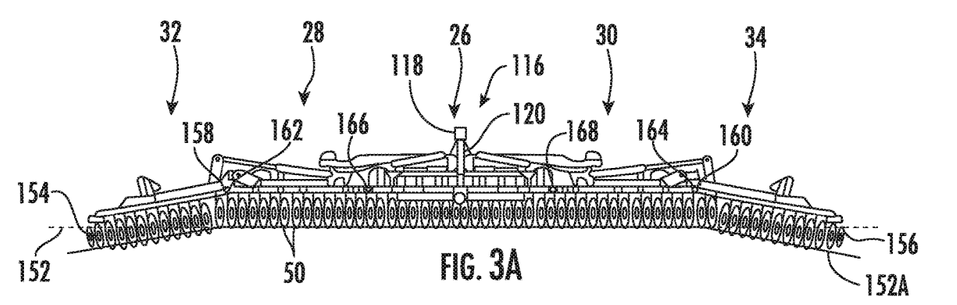
FIGS. 3A-3F illustrate various other rear views of the implement shown in FIG. 1 when in various out-of-level orientations, particularly illustrating various out-of-level field contours created by the implement in such out-of-level orientations relative to a level reference plane in accordance with aspects of the present subject matter.
Figure 3B:
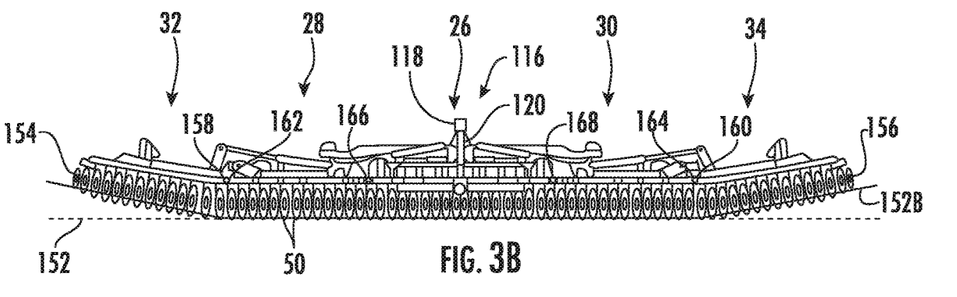
Figure 3C:
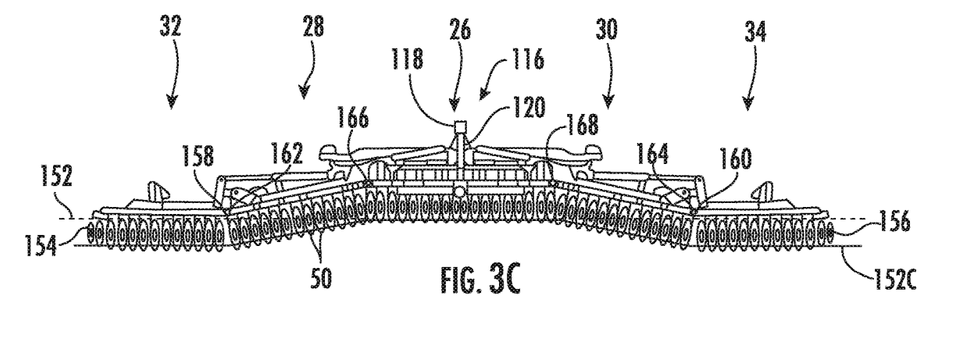
Figure 3D:
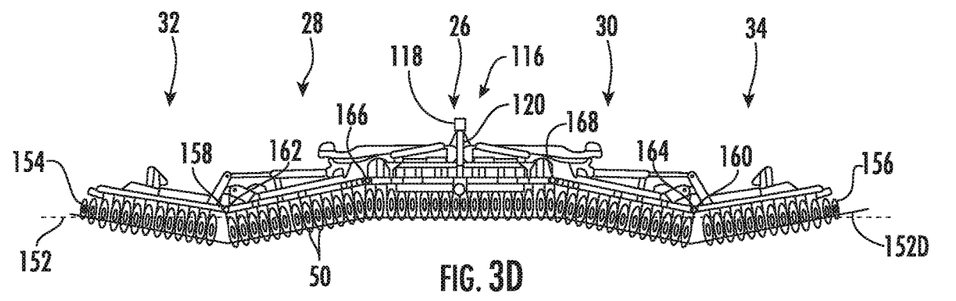
Figure 3E:
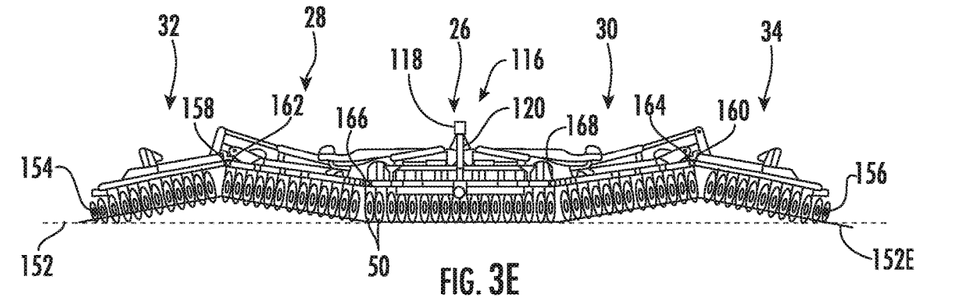
Figure 3F:
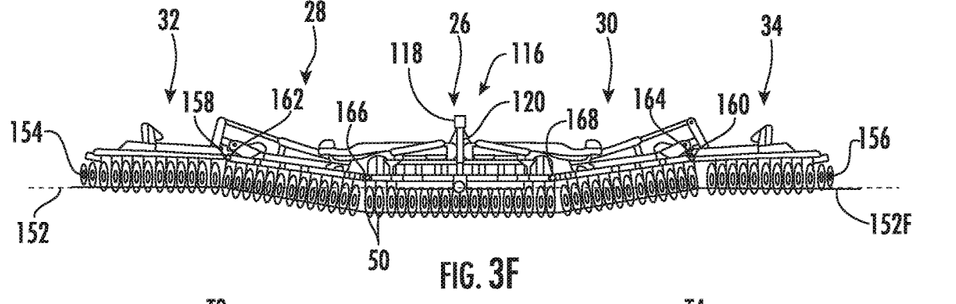

Referring now to FIGS. 2-3F, a series of various states of levelness of the implement 10 are illustrated, particularly illustrating associated field contours created by the implement 10 in such states. Particularly, FIG. 2 illustrates a rear view of the implement 10 when in a level orientation and a corresponding level field contour created by the implement in such level orientation. Additionally, FIGS. 3A-3F illustrate various other exemplary rear views of the implement 10 when in various out-of-level orientations, particularly illustrating various out-of-level field contours created by the implement in such out-of-level orientations relative to a level reference plane.

In general, it is typically desirable for an agricultural implement, such as the implement 10 described above with reference to FIG. 1, to be configured such that, when the implement 10 is in a working position, the wing sections 26, 28, 30, 32, 34 are oriented in a manner that allows all of the ground-engaging tools 50 to be held at substantially the same distance relative to the field, thereby permitting the tools 50 to evenly engage the ground surface to create a level field contour. For instance, as shown in FIG. 2, the wing sections 26, 28, 30, 32, 34 are substantially level relative to each other such that the field contour (indicated by line 152) is level or flat across an entire width of a swath worked by the implement 10, with the slopes of the different lateral sections 126, 128, 130, 132, 134 of the aft portion of the field (as described with reference to FIG. 1) being substantially equal to each other and the slope of the reference plane 152. However, in some cases, as will be described below, the wing sections 26, 28, 30, 32, 34 become out-of-level relative to each other. In such instances, it may be desirable to adjust the levelness of the implement 10, as necessary, to ensure the desired performance is achieved.

For example, referring specifically to FIG. 3A, an example implement orientation is shown in which the outer-wing sections 32, 34 "sag" or extend at a downward angle relative to the respective inner-wing sections 28, 30, with the inner-wing sections 28, 30 and the central frame section 26 being substantially level relative to each other and the level field contour or reference plane 152. More specifically, outermost ends 154, 156 of the outer-wing sections 32, 34 are positioned lower relative to innermost ends 158, 160 of the outer-wing sections 32, 34 such that the disk blades 50 along the outer-wing sections 32, 34 engage the ground surface at different depths. In such instance, sensor data from the field contour sensor 118 will generally indicate that a field contour 152A created by the implement 10 forms a flat-topped mound extending across the entire width of the swath worked by the implement 10 that is level across the central and inner-wing sections 26, 28, 30 and slopes downwardly across the outer-wing sections 32, 34 from the inner-wing sections 28, 30. Accordingly, the slopes of the outer sections 132, 134 (FIG. 1) of the aft portion of the field may be different from the slopes of the central and inner sections 126, 128, 130 (FIG. 1) of the aft portion of the field and the slope of the reference plane 152.

To adjust the levelness of the implement 10 shown in FIG. 3A, the outer-wing actuators 44 (FIG. 1) may, in several embodiments, be actuated to pivot the outer-wing sections 32, 34 such that the outermost ends 154, 156 of the outer-wing sections 32, 34 move upwardly. Further, in some embodiments, the outer-wing wheel actuators 80, 84 (FIG. 1) and/or the gauge wheel actuators 90, 92 (FIG. 1) may be controlled (e.g., actuated to extend such actuator(s)) to increase the distance between the ground and the outer-wing sections 32, 34. Additionally or alternatively, the operation of the engine 15A and/or the transmission 15B of the work vehicle 14 (FIG. 1) may be adjusted to increase the ground speed of the implement 10.

Conversely, with reference to FIG. 3B, an example implement orientation is shown in which the outer-wing sections 32, 34 "lift" or extend at an upward angle relative to the respective inner-wing sections 28, 30, with the inner-wing sections 28, 30 and the central frame section being substantially level relative each other and the level reference plane 152. More specifically, the outermost ends 154, 156 of the outer-wing sections 32, 34 are positioned higher relative to the innermost ends 158, 160 of the outer-wing sections 32, 34 such that the disk blades 50 along the outer-wing sections 32, 34 engage the ground surface at different depths. In such instance, sensor data from the field contour sensor 118 will generally indicate that a field contour 152B created by the implement 10 is a flat-bottomed valley that extends across the entire width of the swath worked by the implement 10. More particularly, the contour 152B is level across the central and inner-wing sections 26, 28, 30 and slopes upwardly from the inner-wing sections 28, 30 across the outer-wing sections 32, 34. Accordingly, the slopes of the outer sections 132, 134 (FIG. 1) of the aft portion of the field may be different from the slopes of the central and inner sections 126, 128, 130 (FIG. 1) of the aft portion of the field and the slope of the reference plane 152.

To adjust the levelness of the implement 10 shown in FIG. 3B, the outer-wing actuators 44 (FIG. 1) may, in several embodiments, be actuated to pivot the outer-wing sections 32, 34 such that the outermost ends 154, 156 of the outer-wing sections 32, 34 move downwardly. Further, in some embodiments, the outer-wing wheel actuators 80, 84 (FIG. 1) and/or the gauge wheel actuators 90, 92 (FIG. 1) may be controlled (e.g., actuated to retract such actuator(s)) to decrease the distance between the ground and the outer-wing sections 32, 34. Additionally or alternatively, the operation of the engine 15A and/or the transmission 15B (FIG. 1) of the work vehicle 14 may be adjusted to decrease the ground speed of the implement 10.

As shown in the exemplary view of FIG. 3C, the inner-wing sections 28, 30 may "sag" or extend at a downward angle relative to the central frame section 26 (which is otherwise level with the reference plane 152), with the outer-wing sections 32, 34 being level across a plane disposed below the reference plane 152. More specifically, the outermost ends 162, 164 of the inner-wing sections 28, 30 are positioned lower relative to the innermost ends 166, 168 of the inner-wing sections 28, 30 such that the disk blades 50 along the inner-wing sections 28, 30 engage the ground surface at different depths. In such instance, sensor data from the field contour sensor 118 will generally indicate that a field contour 152C created by the implement 10 has a flat-topped mound across the central and inner-wing sections 26, 28, 30, with the portions of the contour 152C across the outer-wing sections 32, 34 being level and lower than the portion of the contour 152C across the central frame section 26. Accordingly, the slopes of the inner sections 128, 130 (FIG. 1) of the aft portion of the field may be different from the slopes of the central and outer sections 126, 132, 134 (FIG. 1) of the aft portion of the field and the slope of the reference plane 152.

To adjust the levelness of the implement 10 shown in FIG. 3C, the inner-wing actuators 42 (FIG. 1) may, in several embodiments, be actuated to pivot the inner-wing sections 28, 30 such that the outermost ends 162, 164 of the inner-wing sections 28, 30 move upwardly. Further, in some embodiments, the center wheel actuators 74, 76 (FIG. 1) may be controlled (e.g., actuated to retract such actuator(s)) to decrease the distance between the ground and the central frame section 26, the inner-wing wheel actuators 78, 82 (FIG. 1) may be controlled (e.g., actuated to extend such actuator(s)) to increase the distance between the ground and the inner-wing sections 28, 30, the outer-wing wheel actuators 80, 84 (FIG. 1) may be controlled (e.g., actuated to extend such actuator(s)) to increase the distance between the ground and the outer-wing sections 32, 34, and/or the gauge wheel actuators 90, 92 may be controlled (e.g., actuated to extend such actuator(s)) to increase the distance between the ground and the outer-wing sections 32, 34.

In some instances, as shown in the exemplary view of FIG. 3D, respective pairs of inner and outer wing sections 28, 30, 32, 34 may slope downwardly towards each other. More specifically, the outermost ends 162, 164 of the inner-wing sections 28, 30 are positioned lower relative to the innermost ends 166, 168 of the inner-wing sections 28, 30 and the reference plane 152. Similarly, the outermost ends 154, 156 of the outer-wing sections 32, 34 are positioned higher relative to the innermost ends 158, 160 of the outer-wing sections 32, 34 and the reference plane 152, while being level with the central frame section 26, which is otherwise level with the reference plane 152. In such instance, sensor data from the field contour sensor 118 may generally indicate that a field contour 152D created by the implement 10 has two valleys formed across the respective pairs of inner and outer wing sections 28, 30, 32, 34 and is level across the central frame section 26, with the portions of the contour 152D across the inner-wing sections 28, 30 sloping downward from the level central frame section 26 and the portions of the contour 152D across the outer-wing sections 32, 34 sloping upward from the inner-wing sections 28, 30. Accordingly, the slopes of the inner sections 128, 130 (FIG. 1) of the aft portion of the field may be different from the outer sections 132, 134 (FIG. 1) of the aft portion of the field, and the slopes of the inner and outer sections 128, 130, 132, 134 (FIG. 1) of the aft portion of the field may be different from the slope of the central section 126 (FIG. 1) of the aft portion of the field and the slope of the reference plane 152.

To adjust the levelness of the implement 10 shown in FIG. 3D, the inner-wing actuators 42 (FIG. 1) may, in several embodiments, be actuated to pivot the inner-wing sections 28, 30 such that the outermost ends 162, 164 of the inner-wing sections 28, 30 move upwardly. Further, in some embodiments, center wheel actuators 74, 76 (FIG. 1) may be controlled (e.g., actuated to retract such actuator(s)) to decrease the distance between the ground and the central frame section 26 and/or the inner-wing wheel actuators 78, 82 (FIG. 1) may be controlled (e.g., actuated to extend such actuator(s)) to increase the distance between the ground and the inner-wing sections 28, 30.

Conversely, as shown in the exemplary view of FIG. 3E, respective pairs of inner and outer wing sections 28, 30, 32, 34 may slope upwardly towards each other. More specifically, the outermost ends 162, 164 of the inner-wing sections 28, 30 are positioned higher relative to the innermost ends 166, 168 of the inner-wing sections 28, 30 and the reference plane 152. Similarly, the outermost ends 154, 156 of the outer-wing sections 32, 34 are positioned lower relative to the innermost ends 158, 160 of the outer-wing sections 32, 34 while being level with the reference plane 152, which is otherwise level with the central frame section 26. In such instance, sensor data from the field contour sensor 118 will generally indicate that a field contour 152E created by the implement 10 has two peaks formed across the respective pairs of inner and outer wing sections 28, 30, 32, 34 and is level across the central frame section 26, with the portions of the contour 152E across the inner-wing sections 28, 30 sloping upward from the level central frame section 26 and the portions of the contour 152E across the outer-wing sections 32, 34 sloping downward from the inner-wing sections 28, 30. Accordingly, the slopes of the inner sections 128, 130 (FIG. 1) of the aft portion of the field may be different from the outer sections 132, 134 (FIG. 1) of the aft portion of the field, and the slopes of the inner and outer sections 128, 130, 132, 134 (FIG. 1) of the aft portion of the field may be different from the slope of the central section 126 (FIG. 1) of the aft portion of the field and the slope of the reference plane 152.

To adjust the levelness of the implement 10 shown in FIG. 3E, the inner-wing actuators 42 (FIG. 1) may, in several embodiments, be actuated to pivot the inner-wing sections 28, 30 such that the outermost ends 162, 164 of the inner-wing sections 28, 30 move downwardly. Further, in some embodiments, the inner-wing wheel actuators 78, 82 (FIG. 1) may be controlled (e.g., actuated to retract such actuator(s)) to decrease the distance between the ground and the inner-wing sections 28, 30 and/or the gauge wheel actuators 90, 92 may be controlled (e.g., actuated to retract such actuator(s)) to decrease the distance between the ground and the outer-wing sections 32, 34.

In an additional example, as shown in FIG. 3F, the inner-wing sections 28, 30 may "sag" or extend at a downward angle relative to the outer-wing sections 32, 34 which are level with the reference plane 152, with the central frame section 26 being otherwise level in a plane disposed below the outer-wing sections 32, 34. More specifically, the outermost ends 162, 164 of the inner-wing sections 28, 30 are positioned higher relative to the innermost ends 166, 168 of the inner-wing sections 28, 30 such that the disk blades 50 along the inner-wing sections 28, 30 engage the ground surface at different depths. In such instance, sensor data from the field contour sensor 118 may generally indicate that a field contour 152F created by the implement 10 has a flat-bottomed valley across the central and inner-wing sections 26, 28, 30, with the portions of the contour 152F across the outer-wing sections 32, 34 being level and higher than the portion of the contour 152F across the central frame section 26. Accordingly, the slopes of the inner sections 128, 130 (FIG. 1) of the aft portion of the field may be different from the slopes of the central and outer sections 126, 132, 134 (FIG. 1) of the aft portion of the field and the slope of the reference plane 152.

To adjust the levelness of the implement 10 shown in FIG. 3F, the inner-wing actuators 42 (FIG. 1) may, in several embodiments, be actuated to pivot the inner-wing sections 28, 30 such that the outermost ends 162, 164 of the inner-wing sections 28, 30 move downwardly. Further, in some embodiments, the center wheel actuators 74, 76 (FIG. 1) may be controlled (e.g., actuated to extend such actuator(s)) to increase the distance between the ground and the central frame section 26, the inner-wing wheel actuators 78, 82 (FIG. 1) may be controlled (e.g., actuated to extend such actuator(s)) to increase the distance between the ground and the inner-wing sections 28, 30, the outer-wing wheel actuators 80, 84 (FIG. 1) may be controlled (e.g., actuated to retract such actuator(s)) to decrease the distance between the ground and the outer-wing sections 32, 34, and/or the gauge wheel actuators 90, 92 may be controlled (e.g., actuated to retract such actuator(s)) to decrease the distance between the ground and the outer-wing sections 32, 34.

Figure 4:
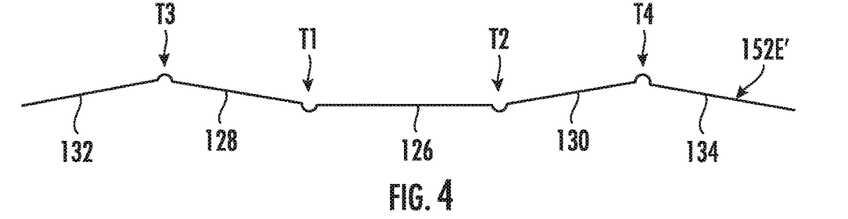
FIG. 4 illustrates an alternative out-of-level field contour created by the implement shown in FIG. 1 when in the out-of-level orientation shown in FIG. 3E in accordance with aspects of the present subject matter.

Referring now to FIG. 4, a schematic view of one embodiment of a system 200 for leveling a multi-wing agricultural implement is illustrated in accordance with aspects of the present subject matter. As will be described below, the system 200 allows for various portions of an implement to be actuated to level the implement. For purposes of discussion, the system 200 will be described herein with reference to the implement 10 and the work vehicle 14 described above and shown in FIG. 1. However, it should be appreciated that the disclosed system 200 may generally be utilized with any suitable implement having any suitable implement configuration and/or with any suitable work vehicle having any suitable vehicle configuration. Additionally, it should be appreciated that communicative links or electrical couplings of the system 200 shown in FIG. 4 are indicated by dashed lines.

As shown, the system 200 includes a controller 202 configured to electronically control the operation of one or more components of the agricultural implement 10. In general, the controller 202 may comprise any suitable processor-based device known in the art, such as a computing device or any suitable combination of computing devices. Thus, in several embodiments, the controller 202 may include one or more processor(s) 204, and associated memory device(s) 206 configured to perform a variety of computer-implemented functions. As used herein, the term "processor" refers not only to integrated circuits referred to in the art as being included in a computer, but also refers to a controller, a microcontroller, a microcomputer, a programmable logic circuit (PLC), an application specific integrated circuit, and other programmable circuits. Additionally, the memory device(s) 206 of the controller 202 may generally comprise memory element(s) including, but not limited to, a computer readable medium (e.g., random access memory (RAM)), a computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 206 may generally be configured to store suitable computer-readable instructions that, when implemented by the processor(s) 204, configure the controller 202 to perform various computer-implemented functions, such as one or more aspects of the methods and algorithms that will be described herein. In addition, the controller 202 may also include various other suitable components, such as a communications circuit or module, one or more input/output channels, a data/control bus and/or the like.

It should be appreciated that, in several embodiments, the controller 202 may correspond to an existing controller of the agricultural implement 10 and/or of the work vehicle 14 to which the implement 10 is coupled. However, it should be appreciated that, in other embodiments, the controller 202 may instead correspond to a separate processing device. For instance, in one embodiment, the controller 202 may form all or part of a separate plug-in module that may be installed within the agricultural implement 10 to allow for the disclosed system and method to be implemented without requiring additional software to be uploaded onto existing control devices of the agricultural implement 10.

In some embodiments, the controller 202 may include a communications module or interface 208 to allow for the controller 202 to communicate with any of the various other system components described herein. For instance, as described above, the controller 202 may, in several embodiments, be configured to receive data inputs from one or more sensors of the agricultural implement 10 that are used to detect one or more parameters associated with the levelness of the implement 10. Particularly, the controller 202 may be in communication with one or more field contour sensors configured to detect one or more parameters associated with or indicative of the levelness of the different frame sections 26, 28, 30, 32, 34 of the implement 10. For instance, the controller 202 may be communicatively coupled to one or more of the field contour sensor(s) 118 via any suitable connection, such as a wired or wireless connection, to allow data indicative of the levelness of the implement 10 to be transmitted from the sensor(s) 118 to the controller 202.

Specifically, referring back to FIGS. 1-3F, each sensing assembly 116 may, for example, include or be associated with one or more field contour sensors 118 installed or otherwise positioned relative to the implement 10 to capture data (e.g., image data, point-cloud data, radar data, ultrasound data, and/or the like) indicative of the profile or surface contour of an aft portion of the field, which, in turn, is indicative of the levelness of the various frame sections 26, 28, 30, 32, 34 of the implement 10. Thus, in several embodiments, the controller 202 may be configured to monitor the levelness of the implement 10 based on the data received from the sensor(s) 118. For example, the controller 202 may be configured to analyze/process the received data to monitor the levelness of the frame sections 26, 28, 30, 32, 34 relative to a level reference plane and/or relative to each other. For instance, the controller 202 may include one or more suitable algorithms stored within its memory 206 that, when executed by the processor 204, allow the controller 202 to infer or estimate the levelness of the frame sections 26, 28, 30, 32, 34 of the implement 10 based on the data received from the sensor(s) 118.

In several embodiments, the controller 202 may be configured to determine that the frame sections 26, 28, 30, 32, 34 of the implement 10 are out-of-level based on the detected surface contour or profile of the aft portion of the field located rearward of the implement 10. In general, when the implement 10 is level, the various ground-engaging tools (e.g., the disk blades 50) mounted on the implement 10 will penetrate the ground to the same or a similar depth. In such instances, the aft portion of the field may generally have a level, horizontal field contour across the width of a swath worked by the implement 10. Conversely, when the implement 10 is out-of-level, the various ground-engaging tools (e.g., the disk blades 50) mounted on the implement 10 may penetrate the ground at varying depths. In such instances, the aft portion of the field may generally have an uneven or unlevel field contour across the width of a swath worked by the implement 10.

As such, in one embodiment, the controller 202 may be configured to compare contours of the different lateral sections 126, 128, 130, 132, 134 of the aft portion of the field associated with the different frame sections 26, 28, 30, 32, 34 of the implement 10 to assess a relative levelness of the different frame sections 26, 28, 30, 32, 34. For instance, the controller 208 may be configured to determine a slope of each lateral section 126, 128, 130, 132, 134 of the surface contour of the aft portion of the field associated with the respective frame sections 26, 28, 30, 32, 34 of the implement 10 and compare the slopes of the different contour sections 126, 128, 130, 132, 134 to determine when the frame sections 26, 28, 30, 32, 34 are out-of-level relative to each other. For example, when the slopes of the contour sections 126, 128, 130, 132, 134 are not approximately equal to each other (e.g., not within a first tolerance of each other), the associated ones of the frame sections 26, 28, 30, 32, 34 are out-of-level relative to each other. For instance, referring back to FIG. 3A, the slopes of the outer sections 132, 134 (FIG. 1) of the aft portion of the field are different from the slopes of the central and inner sections 126, 128, 130 (FIG. 1) of the aft portion of the field, which is indicative of the outer-wing sections 32, 34 of the implement 10 being out-of-level relative to the central frame section 26 and the inner-wing sections 28, 30 of the implement 10. The magnitude and direction of the slopes of the contour sections 126, 128, 130, 132, 134 may also be used to determine the relative positioning of the frame sections 26, 28, 30, 32, 34 relative to each other.

In other embodiments, the controller 202 may be configured to compare the different sections of the contour associated with the different frame sections 26, 28, 30, 32, 34 of the implement 10 to a desired reference plane or contour to determine the levelness of the different frame sections 26, 28, 30, 32, 34 relative to the reference plane. For instance, the controller 208 may be configured to determine a slope of each section 126, 128, 130, 132, 134 of the contour associated with the different frame sections 26, 28, 30, 32, 34 of the implement 10 and compare the slopes of the contour sections 126, 128, 130, 132, 134 to the reference plane to determine when the frame sections 26, 28, 30, 32, 34 are out-of-level relative to the reference plane. For example, when the slopes of the associated contour section 126, 128, 130, 132, 134 are not approximately equal to the slope of the reference plane, such as the reference plane 152, (e.g., within a second tolerance of each other), the associated ones of the frame sections 26, 28, 30, 32, 34 are out-of-level relative to the reference plane 152. For instance, again referring to FIG. 3A, the slopes of the outer sections 132, 134 (FIG. 1) of the aft portion of the field are different from the slope of the reference plane 152, which indicates that the outer-wing sections 32, 34 of the implement 10 are out-of-level relative to the reference plane 152.

Further, in some embodiments, the controller 202 may be configured to assess the continuity of the contour between the different sections of the contour associated with the different frame sections 26, 28, 30, 32, 34. More specifically, the controller 202 may be configured to assess whether the contour of the field has features such as trenches, ridges, steps, and/or the like associated with the transitions between the ends of adjacent frame sections. When such features are present, or at least more present than during normal, level operation of the implement, the associated frame sections 26, 28, 30, 32, 34 of the implement 10 are out-of-level relative to each other. For example, as shown in FIG. 4, an alternative contour 152E' created by the implement 10 shown in FIG. 3E is shown. The alternative contour 152E' includes first and second transition profiles T1, T2 defined between the central section 126 and a respective inner section 128, 130 of the contour 152E', and third and fourth transition profiles T3, T4 defined between the respective inner sections 128, 130 and outer sections 132, 134 of the contour 152E'. The first and second transition profiles T1, T2 are characterized by trenches, formed due to the out-of-level orientation of the central and inner sections 26, 28, 30 of the implement 10 relative to each other. The third and fourth transition profiles T3, T4 are similarly characterized by ridges, formed due to the out-of-level orientation of the inner and outer sections 32, 34 of the implement 10 relative to each other. Accordingly, transition profiles T1, T2, T3, T4 between the adjacent contour sections 126, 128, 130, 132, 134 of the field may be compared to respective baseline transition profiles, with the associated, adjacent frame sections 26, 28, 30, 32, 34 of the implement 10 being out-of-level relative to each other when the corresponding transition profile is different from the respective baseline transition profile.

Figure 5:
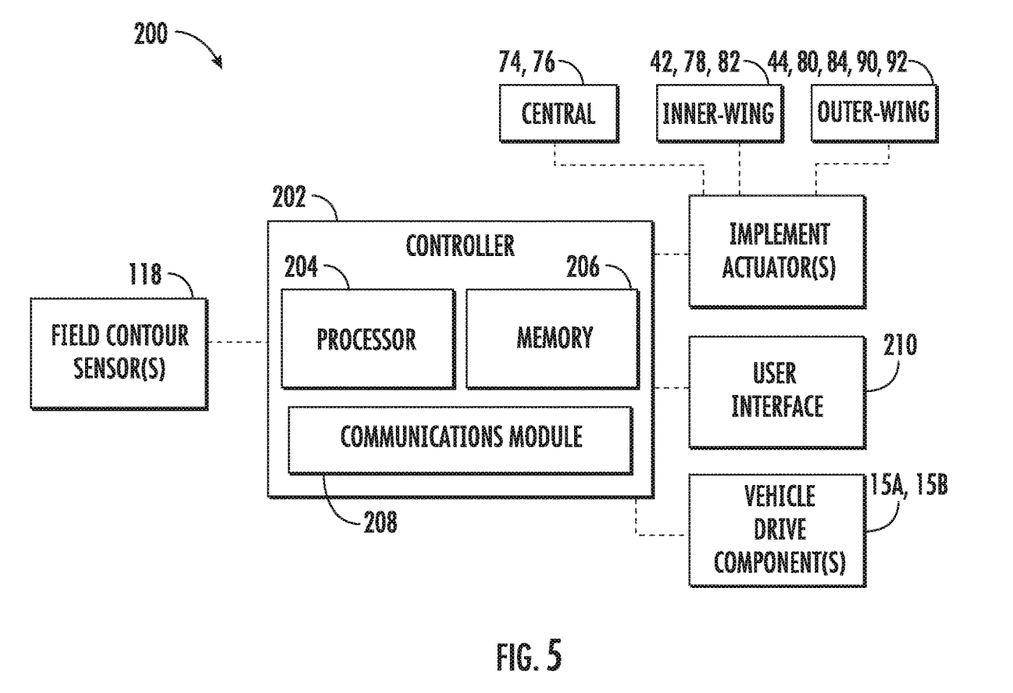
FIG. 5 illustrates a schematic view of one embodiment of a system for monitoring the levelness of a multi-wing agricultural implement in accordance with aspects of the present subject matter.

Additionally, in several embodiments, the controller 202 may be configured to perform one or more implement-related control actions based on the data received from the sensor(s) 118. Specifically, the controller 202 may be configured to control one or more components of the agricultural implement 10 based on the determined levelness of the implement 10, specifically based on the levelness of the various frame sections 26, 28, 30, 32, 34 of the implement 10, as described above with reference to FIGS. 3A-4, to level the implement 10. For example, as shown in FIG. 5, the controller 202 may be configured to control one or more actuators associated with the central frame section 26, such as the center wheel actuators 74, 76. Further, the controller 202 may be configured to control one or more actuators associated with the inner-wing sections 28, 30, such as the inner-wing actuators 42 and/or the inner-wing wheel actuators 78, 82. Moreover, the controller may be configured to control one or more actuators associated with the outer-wing sections 32, 34, such as the outer-wing actuators 44, the outer-wing wheel actuators 80, 84, and/or the gauge wheel actuators 90, 92.

Further, in some embodiments, the controller 202 may be configured to indicate to an operator the relative levelness of the frame sections 26, 28, 30, 32, 34 of the implement 10. For example, in the embodiment shown in FIG. 5, the communications module 208 may allow the controller 202 to communicate with a user interface 210 having a display device configured to display information regarding the levelness of the implement 10 and/or suggested control actions. However, it should be appreciated that the controller 202 may instead be communicatively coupled to any number of other indicators, such as lights, alarms, and/or the like to provide an indicator to the operator regarding the levelness of the implement 10 and/or suggested control actions.

In addition, in some embodiments, the user interface 210 may include one or more input devices (not shown), such as touchscreens, keypads, touchpads, knobs, buttons, sliders, switches, mice, microphones, and/or the like, which are configured to receive user inputs from the operator. For instance, the controller 202 may control the operation of the user interface 210 to display the sensor data to the operator. For example, the controller 202 may control the operation of the user interface 210 to display data associated with the contour of the aft portion of the field, such as the relative positioning of the various frame sections 26, 28, 30, 32, 34, the slopes of the various frame sections 26, 28, 30, 32, 34, and/or the slopes of the different lateral sections 126, 128, 130, 132, 134 of the aft portion of the field. In some embodiments, the controller 202 may further be configured to receive one or more user inputs from the operator via the user interface 210, including inputs associated with the levelness of the implement. For example, the controller 202 may receive inputs indicative of the one or more of the frame sections 26, 28, 30, 32, 34 being out-of-level relative to other frame section(s) 26, 28, 30, 32, 34 or a reference plane, such as the reference plane 152, and/or inputs instructing the controller 202 to execute one or more control actions to adjusted the levelness of the implement 10. In some embodiments, the controller 202 may receive inputs indicative of a topography of the field, elevation of the field, and/or the like. In one embodiment, the user interface 210 may be positioned within a cab (not shown) of the vehicle 14. However, in alternative embodiments, the user interface 210 may have any suitable configuration and/or be positioned in any other suitable location.

Additionally or alternatively, in some embodiments, the controller 202 may be configured to perform one or more vehicle-related control actions based on the estimation of the levelness of the implement 10. For example, as shown in FIG. 5, in some embodiments, the controller 202 may be configured to control the operation of one or more vehicle drive components configured to drive the vehicle 14 coupled to the implement 10, such as the engine 15A and/or the transmission 15B of the vehicle 14. In such embodiments, the controller 202 may be configured to control the operation of the vehicle drive component(s) 15A, 15B based on the estimated levelness of the implement 10, for example, to slow down or speed up the vehicle 14 and implement 10 as described above or bring the vehicle 14 and implement 10 to a stop.

It should be appreciated that, depending on the type of controller 202 being used, the above-described control actions may be executed directly by the controller 202 or indirectly via communications with a separate controller. For instance, when the controller 202 corresponds to an implement controller of the implement 10, the controller 202 may be configured to execute the implement-related control actions directly while being configured to execute the vehicle-related control actions by transmitting suitable instructions or requests to a vehicle-based controller of the vehicle 14 towing the implement 10 (e.g., using an ISObus communications protocol). Similarly, when the controller 202 corresponds to a vehicle controller of the vehicle 14 towing the implement 10, the controller 202 may be configured to execute the vehicle-related control actions directly while being configured to execute the implement-related control actions by transmitting suitable instructions or requests to an implement-based controller of the implement 10 (e.g., using an ISObus communications protocol). In other embodiments, the controller 202 may be configured to execute both the implement-based control actions and the vehicle-based control actions directly or the controller 202 may be configured to execute both of such control action types indirectly via communications with a separate controller.

Figure 6:
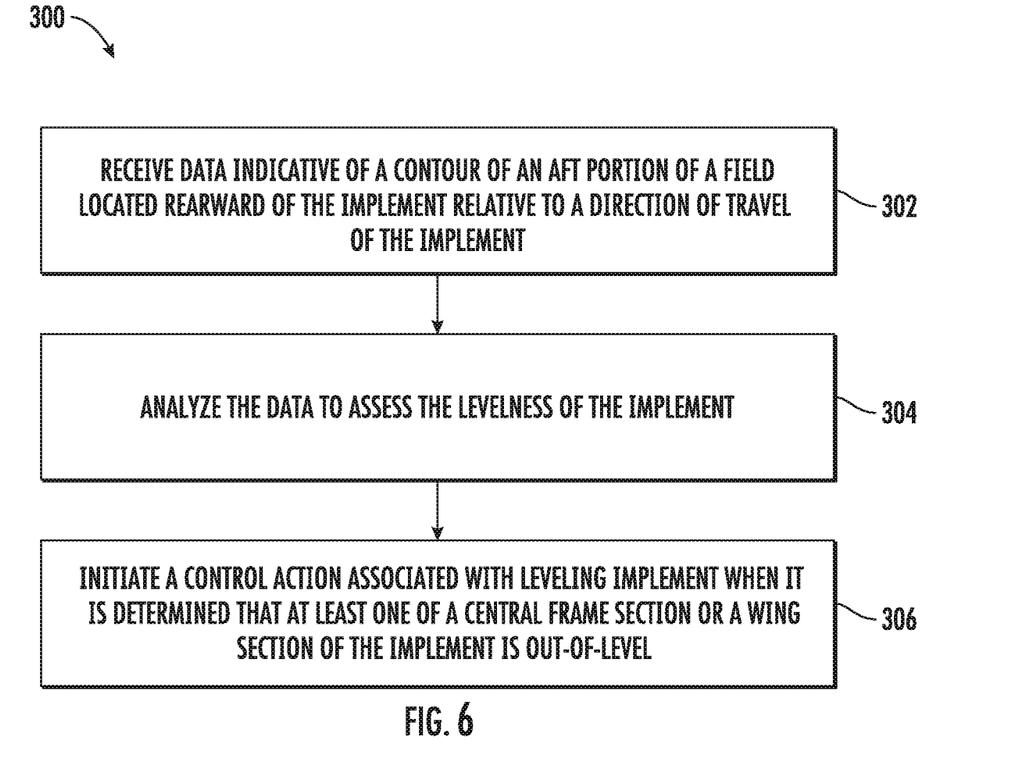
FIG. 6 illustrates a flow diagram of one embodiment of a method for monitoring the levelness of a multi-wing agricultural implement in accordance with aspects of the present subject matter.

Referring now to FIG. 6, a flow diagram of one embodiment of a method 300 for monitoring the levelness of a multi-wing agricultural implement is illustrated in accordance with aspects of the present subject matter. In general, the method 300 will be described herein with reference to the implement 10 shown in FIGS. 1-3F, the field contours shown in FIGS. 3A-4, as well as the system 200 shown in FIG. 5. However, it should be appreciated that the disclosed method 300 may be executed with implements having any other suitable configurations and/or with systems having any other suitable system configuration. In addition, although FIG. 6 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined and/or adapted in various ways without deviating from the scope of the present disclosure.

As shown in FIG. 6, at (302), the method 300 may include receiving data indicative of a contour of an aft portion of a field located rearward of the implement relative to a direction of travel of the implement. For instance, as described above, the controller 202 may be configured to receive data from a field contour sensor 118 in communication with the controller 202, with the field contour sensor 118 generating data indicative of a profile or surface contour of the portion of the field positioned rearward of the implement 10.

Moreover, at (304), the method 300 may include analyzing the data to assess the levelness of the implement. For example, as described above, the controller 202 may compare a slope of a portion of the surface contour associated with a respective section of the implement 10 to a slope of a reference plane, such as the reference plane 152, or to a slope of another portion of the surface contour associated with another respective section of the implement 10 to assess the levelness of the implement 10. The controller 202 may determine that the implement 10 is out-of-level when the slope of at least one of the frame sections of the implement 10 differs from the slope of the reference plane and/or the slope of at least one of the other frame sections by a given degree or threshold. Similarly, the controller 202 may compare a transition profile T1, T2, T3, T4 between adjacent lateral sections 126, 128, 130, 132, 134 of the field to a baseline transition profile and determine that the associated, adjacent frame sections of the implement 10 are out-of-level when the transition profile differs from the baseline transition profile.

Additionally, at (306), the method 300 may include initiating a control action associated with leveling the implement when it is determined that at least one of a central frame section or a wing section of the implement is out-of-level. For instance, in one embodiment, the controller 202 may be configured to control the operation of one or more actuators to adjust the levelness of one or more of the frame sections relative to the reference plane and/or relative to one or more other the frame sections. In a further embodiment, the controller 202 may be configured to indicate to an operator the levelness of the implement 10. In an additional embodiment, the controller 202 may be configured to control a drive member of the vehicle towing the implement 10, such as the engine 15A and/or the transmission 15B of the vehicle 14.

It is to be understood that the steps of the method 300 are performed by the controller 202 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller 202 described herein, such as the method 300, is implemented in software code or instructions which are tangibly stored on a tangible computer readable medium. The controller 202 loads the software code or instructions via a direct interface with the computer readable medium or via a wired and/or wireless network. Upon loading and executing such software code or instructions by the controller 202, the controller 202 may perform any of the functionality of the controller 202 described herein, including any steps of the method 300 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for monitoring the levelness of a multi-wing agricultural implement, the system comprising:
   a central frame section;
   a wing section pivotably coupled to the central frame section;
   a field contour sensor configured to generate data indicative of a contour of an aft portion of a field located rearward of the implement relative to a direction of travel of the implement; and
   a controller communicatively coupled to the field contour sensor, the controller being configured to monitor the data generated by the field contour sensor and assess at least one of a levelness of the wing section relative to the central frame section or a levelness of at least one of the wing section or the central frame section relative to a reference plane based at least in part on the contour of the aft portion of the field.

2. The system of claim 1, wherein the controller is configured to determine a slope of each lateral section of the contour of the aft portion of the field associated with a respective one of the central frame section or the wing section, and compare the slopes of the respective lateral sections of the contour to a slope of the reference plane to assess the levelness of the at least one of the wing section or the central frame section relative to the reference plane, the at least one of the central frame section or the wing section being out-of-level relative to the reference plane when the slope of the respective lateral section of the contour differs from the slope of the reference plane by at least a threshold difference.

3. The system of claim 1, wherein the controller is configured to determine a slope of each lateral section of the contour of the aft portion of the field associated with a respective one of the central frame section or the wing section, and compare the slopes of the respective lateral sections of the contour to each other to assess the levelness of the wing section relative to the central frame section, the central frame section and the wing section being out-of-level relative to each other when the slopes of the respective lateral sections of the contour differ from each other by at least a threshold difference.

4. The system of claim 1, wherein the controller is configured to compare a transition profile between adjacent lateral sections of the contour of the aft portion of the field associated with a transition between the central frame section and the wing section to a baseline transition profile to assess the levelness of the wing section relative to the central frame section, the central frame section and the wing section being out-of-level relative to each other when the transition profile between adjacent lateral sections of the contour differs from the baseline transition profile.

5. The system of claim 1, wherein the controller is further configured to control an operation of a user interface to display data associated with the contour of the aft portion of the field and receive an operator input associated with the levelness of the at least one of the levelness of the wing section relative to the central frame section or the levelness of the at least one of the wing section or the central frame section relative to the reference plane.

6. The system of claim 1, further comprising an implement actuator configured to actuate at least one of the central frame section or the wing section,
   wherein the controller is further configured to control an operation of the implement actuator to adjust the levelness of the at least one of the central frame section or the wing section when at least one of the central frame section and the wing section are out-of-level relative to each other or the at least one of the central frame section or the wing section is out-of-level relative to the reference plane.

7. The system of claim 6, wherein the implement actuator comprises at least one of a wheel actuator or a wing actuator, the wheel actuator being coupled to the central frame section or the wing section independently of a ground engaging tool supported on the central frame section or the wing section, the wing actuator being coupled between the central frame section and the wing section.

8. The system of claim 1, wherein the controller is further configured to adjust a speed of the implement when at least one of the central frame section and the wing section are out-of-level relative to each other or the at least one of the central frame section or the wing section is out-of-level relative to the reference plane.

9. The system of claim 1, wherein the field contour sensor comprises at least one of a camera, a LIDAR device, or a RADAR sensor.

10. The system of claim 1, wherein the wing section comprises a first wing section extending between a first innermost end and a first outermost end along a lateral direction
   wherein the central frame section extends between a first central end and a second central end along the lateral direction, the first innermost end of the first wing section being pivotably coupled to the first central end of the central frame section,
   the system further comprising a second wing section extending between a second innermost end and a second outermost end along the lateral direction, the second innermost end of the second wing section being pivotably coupled to the second central end of the central frame section, opposite the first wing section in the lateral direction,
   wherein assessing at least one of the levelness of the wing section relative to the central frame section or the levelness of the at least one of the wing section or the central frame section relative to a reference plane comprises assessing at least one of the levelness of at least one of the first wing section or the second wing section relative to the central frame section in the lateral direction or the levelness of at least one of the first wing section, the second wing section, or the central frame section relative to a reference plane in the lateral direction.

11. A method for monitoring the levelness of a multi-wing agricultural implement, the multi-wing agricultural implement having a central frame section and a wing section pivotably coupled to the central frame section, the method comprising:
   receiving, with a computing device, data indicative of a contour of an aft portion of a field located rearward of the implement relative to a direction of travel of the implement;
   analyzing, with the computing device, the data to assess at least one of:
      a levelness of the wing section relative to the central frame section; or a levelness of at least one of the wing section or the central frame section relative to a reference plane; and initiating, with the computing device, a control action associated with leveling the implement when it is determined that at least one of:

the central frame section and the wing section are out-of-level relative to each other based at least in part on the levelness of the wing section relative to the central frame section; or the at least one of the central frame section or the wing section is out-of-level relative to the reference plane based at least in part on the levelness of the at least one of the wing section or the central frame section relative to the reference plane.

12. The method of claim 11, wherein analyzing the data comprises determining a slope of each lateral section of the contour of the aft portion of the field associated with one of the central frame section or the wing section, and comparing the slopes of the respective lateral sections of the contour to a slope of the reference plane, the at least one of the central frame section or the wing section being out-of-level relative to the reference plane when the slope of the respective lateral section of the contour differs from the slope of the reference plane by at least a first threshold difference.

13. The method of claim 11, wherein analyzing the data comprises determining a slope of each lateral section of the contour of the aft, portion of the field associated with one of the central frame section or the wing section, and comparing the slopes of the respective lateral sections of the contour to each other, the central frame section and the wing section being out-of-level relative to each other when the slope of the respective lateral sections of the contour differ from each other by at least a second threshold difference.

14. The method of claim 11, wherein analyzing the data comprises comparing a transition profile between adjacent lateral sections of the contour of the aft portion of the field associated with a transition between the central frame section and the wing section to a baseline transition profile, the central frame section and the wing section being out-of-level relative to each other when the transition profile between adjacent lateral sections of the contour differs from the baseline transition profile.

15. The method of claim 11, wherein analyzing the data comprises controlling an operation of a user interface to display the data and receiving an input from an operator via the user interface indicating at least one of:

the central frame section and the wing section being out-of-level relative to each other; or the at least one of the central frame section or the wing section being out-of-level relative to the reference plane.

16. The method of claim 11, the implement further comprising an implement actuator configured to actuate at least one of the central frame section or the wing section, wherein the control action comprises controlling an operation of the implement actuator to adjust the levelness of the at least one of the central frame section or the wing section.

17. The method of claim 16, wherein the implement actuator comprises at least one of a wheel actuator or a wing actuator, the wheel actuator being coupled to the central frame section or the wing section independently of aground engaging tool supported on the central frame section or the wing, section, the wing actuator being coupled between the central frame section and the wing section.

18. The method of claim 11, wherein the control action comprises adjusting a speed of the implement.

19. The method of claim 11, wherein the data is generated by a field contour sensor.

20. The method of claim 19, wherein the field contour sensor comprises at least one of a camera, a LIDAR device, or a RADAR sensor.

* * * * *